United States Patent [19]

Nakagaki et al.

[11] Patent Number: 4,630,104
[45] Date of Patent: Dec. 16, 1986

[54] CIRCUIT ARRANGEMENT FOR REMOVING NOISE OF A COLOR VIDEO SIGNAL

[75] Inventors: Shintaro Nakagaki, Fujisawa; Takashi Kuriyama, Tokyo, both of Japan

[73] Assignee: Victor Company of Japan, Ltd., Japan

[21] Appl. No.: 623,348

[22] Filed: Jun. 22, 1984

Related U.S. Application Data

[63] Continuation-in-part of Ser. No. 596,552, Apr. 4, 1984.

[30] Foreign Application Priority Data

Jun. 24, 1983 [JP] Japan ................................ 58-113859

[51] Int. Cl.⁴ ............................................. H04N 9/64
[52] U.S. Cl. ..................................................... 358/36
[58] Field of Search ........................... 358/36, 37, 167

[56] References Cited

U.S. PATENT DOCUMENTS 3,780,215 12/1973 Shibata et al. ...................... 358/37
4,130,805 12/1978 Mori et al. ......................... 358/167
4,302,768 11/1981 Kamura et al. ....................... 358/36
4,389,665 6/1983 Nagao et al. ........................ 358/37
4,504,863 3/1985 Lacoste ............................. 358/167

FOREIGN PATENT DOCUMENTS 123292 7/1983 Japan ................................ 358/36

Primary Examiner—John W. Shepperd
Attorney, Agent, or Firm—Lowe, Price, LeBlanc, Becker & Shur

[57] ABSTRACT

A luminance signal and a chroma signal of a color video signal are processed respectively such that first and second signals are generated, where the first signal indicates the contour line of images represented by the video signal and the second signal includes noise included in the chroma signal and a signal component having an amplitude substantially equal to the peak to peak value of the noise. These first and second signals are then fed to either a switching circuit or a multiplier so that a resultant output signal having only the noise is obtained. The noise components are then subtracted, by way of a subtractor, from the chroma signal so that a chroma signal having no noise will be obtained.

11 Claims, 8 Drawing Figures

CIRCUIT ARRANGEMENT FOR REMOVING NOISE OF A COLOR VIDEO SIGNAL

BACKGROUND OF THE INVENTION

This application is a continuation-in-part of Ser. No. 596,552 filed on Apr. 4, 1984.

This invention relates generally to video signal processing, and more particularly to a circuit arrangement for removing noise included in a color video signal thereby improving signal-to-noise ratio of the video signal for obtaining a high-quality reproduced picture.

It is naturally required that a video signal of satisfactory signal-to-noise ratio (S/N) is provided for obtaining a reproduced image of high quality, and various apparatus for processing a video signal have hitherto been proposed for obtaining a video signal of satisfactory S/N.

In a conventional circuit arrangement for improving S/N of a video signal, such as a chroma signal from a pickup tube of a video camera, noise included in the video signal is reduced by subtracting a noise signal, which is produced by extracting noise components of the video signal from the video signal, from the video signal. In this way, since noise reduction has hitherto been effected by simply subtracting the noise components from the video signal, where the noise components are produced by way of a differentiator responsive to the video signal and a clipping circuit responsive to an output signal from the differentiator, a resultant video signal obtained as the result of subtraction has suffered from dull or blunt leading and trailing edges in the waveform where luminance drastically changes. Accordingly, the resultant video signal obtained in this way has a waveform different from that of the output signal from the video camera especially at portions corresponding to contour of images taken. Because of such deteriorated waveform of the video signal white balance of the video signal is disturbed resulting in a phenomenon wherein a picture obtained by reproducing the video signal suffers from the occurrence of colored border at the contour lines of subjects taken.

SUMMARY OF THE INVENTION

The present invention has been developed in order to remove the above-described drawbacks inherent to the conventional circuit arrangement for improving S/N of a video signal.

It is, therefore, an object of the present invention to provide a new and useful circuit arrangement for improving S/N of a video signal by effectively removing or reducing noise included in the video signal so that the waveform of the processed video signal does not suffer from dull or blunt leading or trailing edges.

According to a feature of the present invention a luminance signal and a chroma signal of a color video signal are processed respectively such that first and second signals are generated, where the first signal indicates the contour line of images represented by the video signal and the second signal includes noise included in the chroma signal and a signal component having an amplitude subtantially equal to the peak to peak value of the noise. These first and second signals are then fed to either a switching circuit or a multiplier so that a resultant output signal having only the noise is obtained. The noise components are then subtracted, by way of a subtractor, from the chroma signal so that a chroma signal having no noise will be obtained.

In accordance with the present invention there is provided a circuit arrangement for removing noise included in a color video signal including a luminance signal and a chroma signal, comprising: first means responsive to said luminance signal of said video signal for generating a first signal indicative of the contour lines of images of a picture which is represented by said video signal; second means responsive to said chroma signal of said video signal for generating a second signal including noise of said chroma signal, and a signal component having an amplitude substantially equal to that of the peak to peak value of said noise; a switching circuit responsive to said first and second signals and having a d.c. voltage source so that switching between said second signal and a d.c. voltage from said d.c. voltage source is effected in response to said first signal for producing a third signal including only said noise of said second signal; and a subtractor responsive to said chroma signal and said third signal for producing an output color video signal indicative of the difference between said chroma signal and said noise of said third signal.

In accordance with the present invention there is also provided a circuit arrangement for removing noise included in a color video signal including a luminance signal and a chroma signal, comprising: first means responsive to said luminance signal of said video signal for generating a first signal indicative of the contour lines of images of a picture which is represented by said video signal; second means responsive to said chroma signal of said video signal for generating a second signal including noise of said chroma signal, and a signal component having an amplitude substantially equal to the peak to peak value of said noise; a multiplier responsive to said first and second signals so that said first signal is multiplied by said second signal for producing a third signal including only said noise of said second signal; and a subtractor responsive to said chroma signal and said third signal for producing an output color video signal indicative of the difference between said chroma signal and said noise of said third signal.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
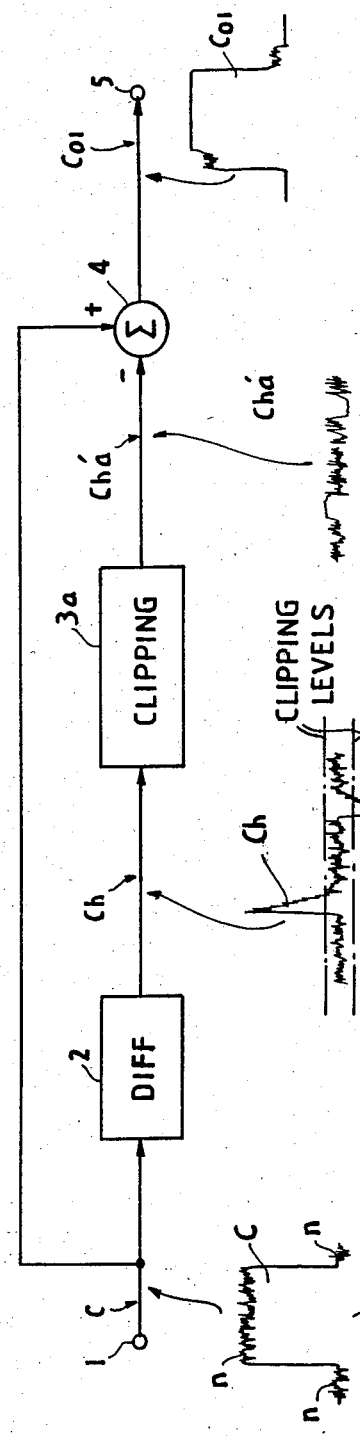
FIG. 1 is a block diagram showing a conventional circuit arrangement.
Figure 2:
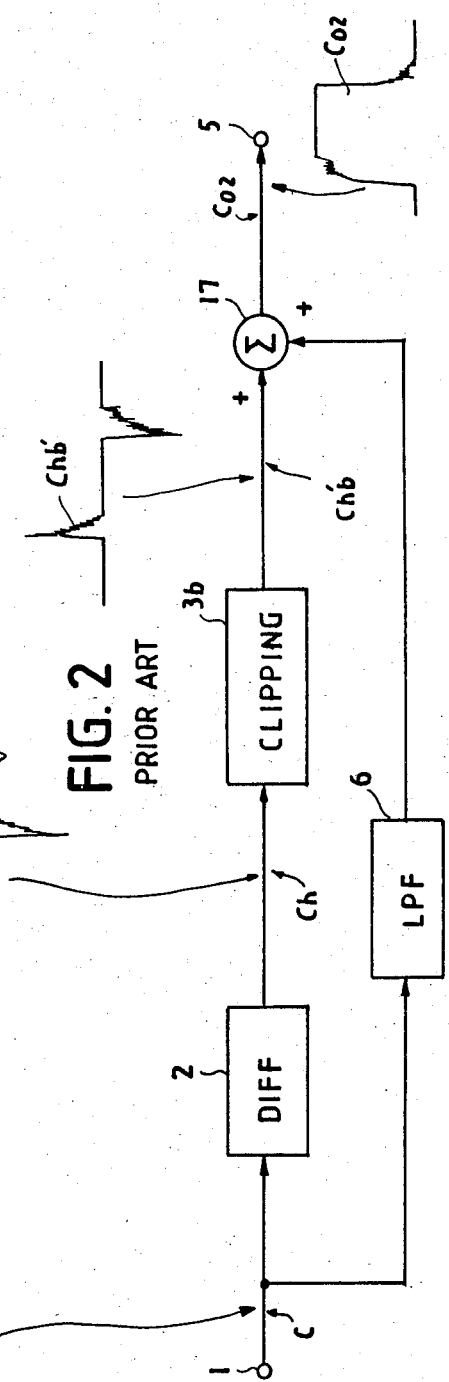
FIG. 2 is a block diagram showing another conventional circuit arrangement.

Prior to describing the preferred embodiments of the present invention, the above-mentioned conventional circuit arrangements will be described for a better understanding of the present invention. FIGS. 1 and 2 are block diagrams showing examples of circuit arrangement for processing a video signal, which have been conventionally used for improving S/N of a color video signal, and in FIGS. 1 and 2, the reference 1 is an input terminal of a color video signal; 2, a differentiator; 3a and 3b, clipping circuits; 4, a subtractor; 5, an output terminal; 6, a low pass filter; and 17, an adder.

In the conventional circuit arrangement shown in FIGS. 1 and 2, when a color video signal including noise "n" as seen in waveform C of respective diagrams, is applied to the input terminal 1, the color video signal C is then fed to the differentiator 2 and the subtractor 4 in the conventional arrangement of FIG. 1, and to the differentiator 2 and the low pass filter 6 in the conventional arrangement of FIG. 2.

High frequency components Ch of the color video signal C are outputted from the differentiator 2 with the color video signal being differentiated by the differentiator 2. The output signal Ch from the above-mentioned differentiator 2 is clipped at a signal level corresponding to peak to peak value of the noise by the clipping circuit 3a, 3b so that signal Ch'a, Ch'b of the drawing is outputted from the clipping circuit 3a, 3b.

In the conventional circuit arrangement of FIG. 1, the above-mentioned output signal Ch'a from the clipping circuit 3a is supplied to the subtractor 4 as a subtrahend signal so as to be subtracted from the input color video signal C applied to the subtractor 4 as a minuend signal, and therefore an output color video signal Co1 is outputted from the subtractor 4 to the output terminal 5. In the conventional circuit arrangement of FIG. 2, the above-mentioned output signal Ch'b from the clipping circuit 3a and an output signal from the low pass filter 6 are added to each other by the adder 17 so that an output color video signal Co2 is outputted from the adder 17 to the output terminal 5.

In the conventional circuit arrangement described with reference to FIGS. 1 and 2, the output color video signal Co1, Co2 outputted to the output terminal 5 has a waveform different from that of the input color video signal at its rising portion and falling portion, and therefore, white balance is lost at the contour portion of a reproduced image resulting in the occurrence of a colored border.

Figure 3:
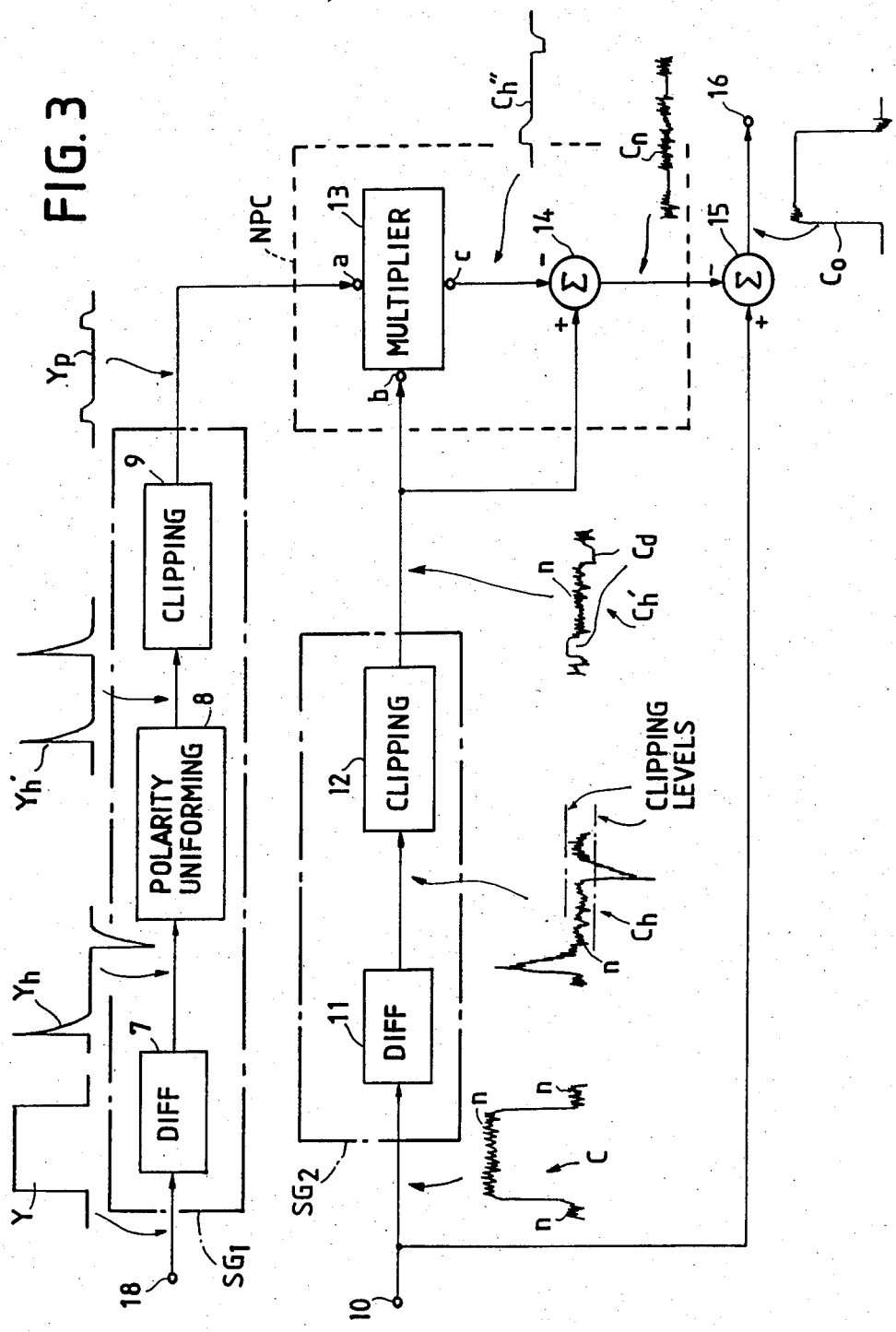
FIG. 3 is a schematic block diagram showing an embodiment of the circuit arrangement according to the present invention.

Referring now to FIG. 3, an embodiment of the circuit arrangement according to the present invention is shown. In FIG. 3, the references 18 and 10 are input terminals for a luminance signal Y and a chroma signal derived from a color video signal video signals; 7 and 11, differentiators; 8, a polarity-uniforming circuit; 9 and 12, clipping circuits; 13, a multiplier (gate circuit for multiplication); 14 and 15, subtractors; 16, an output terminal.

The above-mentioned differentiator 7, the polarity-uniforming circuit 8, the clipping circuit 9 form a first signal generating circuit SG1 for producing a contour line signal, and the first signal generating circuit SG1 outputs a contour line signal Yp in correspondence with a portion where luminance variation is large in the luminance signal Y fed to the input terminal 18 of the video signal, and the countour line signal is fed to a noise extracting circuit NPC in turn.

Namely, the luminance signal Y fed to the input terminal 18 in FIG. 3, is outputted as a signal Yh from the differentiator 7 after being differentiated by the differentiator 7, and subsequently the output signal Yh from the differentiator 7 is fed to the clipping circuit 9 with its polarity being made uniform by the polarity-uniforming circuit 8 as a signal Yh' in FIG. 3. The clipping circuit 9 clips the signal Yh' fed thereto at an appropriate level so as to produce the contour line signal Yp which is fed to an input terminal "a" of a multiplier 13 (a gate circuit 13 for multiplication) of the noise extracting circuit NPC.

Figure 4:
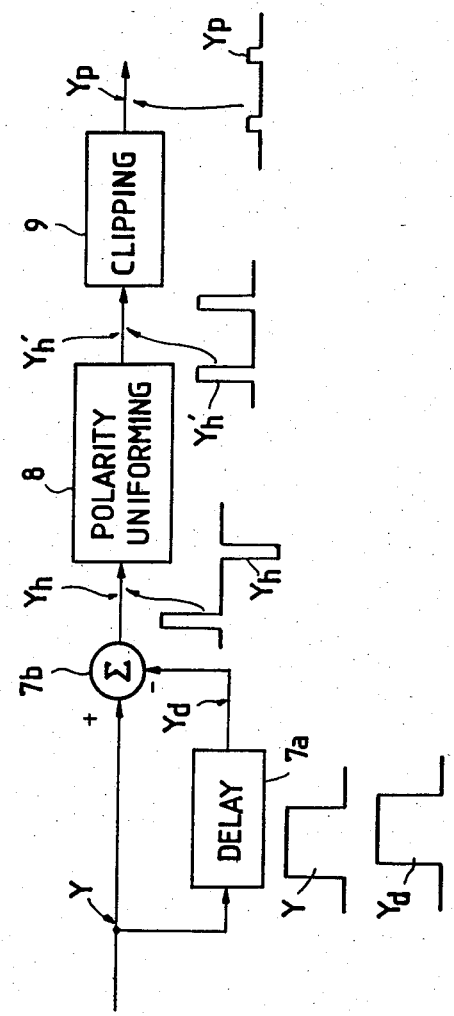
FIG. 4 is a schematic block diagram showing a portion of another embodiment of the circuit arrangement according to the present invention.

While the above-mentioned first signal generating circuit SG1 shown in FIG. 3 is constructed of, the differentiator 7, the polarity-uniforming circuit 8, the clipping cicuit 9, FIG. 4 is a block diagram showing another structural example of the first signal generating circuit SG1. In this another first signal generating circuit SG1 of FIG. 4, a delay circuit 7a and a subtractor 7b are used in place of the differentiator 7 shown in FIG. 3 so that the contour line signal is obtained using the luminance signal Y and a delayed singal Yd of the luminance signal Y.

Figure 5:
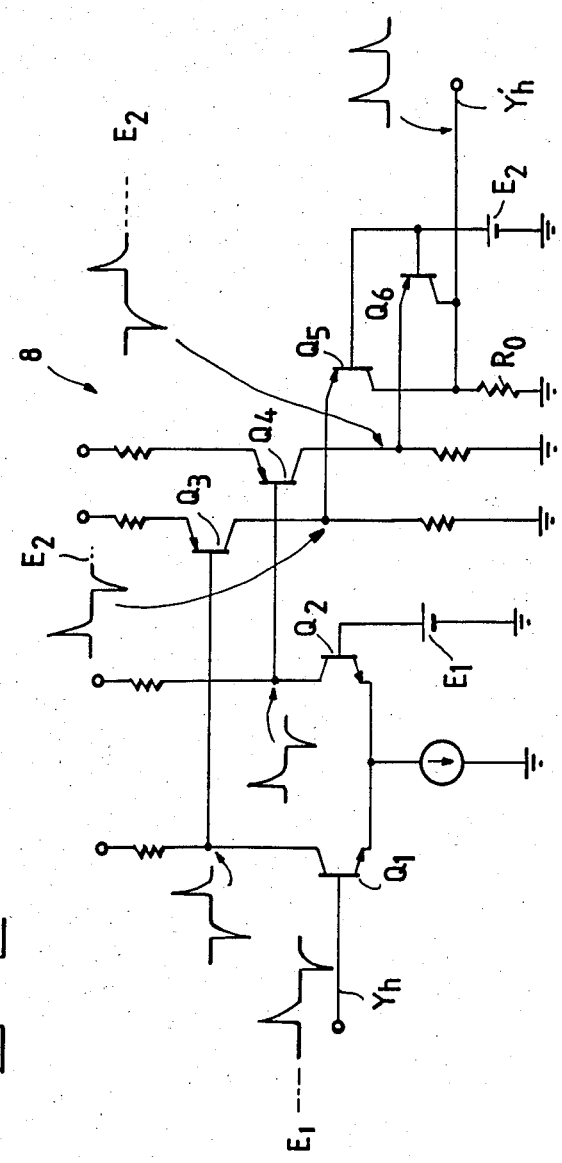
FIG. 5 is a circuit diagram of the polarity uniforming circuit of FIGS. 3 and 4.

FIG. 5 shows an example of the polarity-uniforming circuit 8 shown in FIGS. 3 and 4. As will be understood from the circuit diagram a transistor Q1 responsive to the signal Yh from the differentiator 7 of FIG. 3 or from the subtractor 7b of FIG. 4 develops an opposite polarity output signal at its collector, while another transistor Q2 develops an output signal of the same polarity as that of the signal Yh at its collector. These two signals are respectively inverted by transistors Q3 and Q4, and then portions whose voltage is higher than a reference voltage E2 from a voltage source are respectively detected by transistors Q5 and Q6, and are extracted to be added to each other by a resistor Ro. Then an output signal Yh' having only positive polarity is obtained at an output terminal.

The chroma signal C fed to the input terminal 10 in FIG. 3, is differentiated by a differentiator 11 of the second signal generating circuit SG2 also having a clipping circuit 12. As a result, a signal Ch including high frequency components and a signal component having substantially the same amplitude as peak to peak value of noise components included in the high frequency components is obtained. Then the signal Ch is clipped by the clipping circuit 12 so that an output signal Ch' including noise of the chroma signal and the signal component having an amplitude substantially equal to that of the peak to peak value of said noise is obtained.

As the above-mentioned clipping circuit 12 may be used a circuit having a structure so that it is possible to clip the signal Ch in connection with both positive and negative sides at a signal substantially the same as the peak to peak value of the noise "n" included in the signal Ch fed thereto, and a slicer may also be used as the above-mentioned clipping circuit 12.

The above-described first and second signal generators SG1 and SG2 are both described in applicant's prior applications titled "Noise Reduction Circuit for a Color Video Signal" (in Japan, 58-61296 filed on Apr. 7, 1983; in the United States, Ser. No. 596,552 filed on Apr. 4, 1984; in United Kingdom, No. 8409004 filed in Apr. 6, 1984; in West Germany, P34 12 407.1 filed on Apr. 3, 1984; in France, No. 840,5519 filed on Apr. 6, 1984).

The signal Ch' outputted from the second signal generating circuit SG2 is fed to an input terminal "b" of the multiplier (gate circuit for multiplication) 13 of the noise extracting circuit NPC, and is also fed to the subtractor 14 of the noise extracting circuit NPC as a minuend signal. As the above-mentioned multiplier 13 may be used a circuit arrangement having a structure shown in FIG. 6 for instance.

The multiplier 13 effects multiplication between the output signal Yp (contour signal Yp) fed from the first signal generating circuit SG1 to the input terminal "a" thereof and the output signal Ch' fed from the second signal generating circuit SG2 to the input terminal "b" thereof, so as to output a signal Ch" illustrated in FIG. 3 from an output terminal "c".

The output signal Ch" from the multiplier 13 is supplied as a subtrahend to the subtractor 14, to which the signal Ch' is fed as a minuend signal. And then the subtractor 14 of the noise extracting circuit NPC outputs a signal having no signal components but only noise as shown at Cn in FIG. 3.

Figure 6:
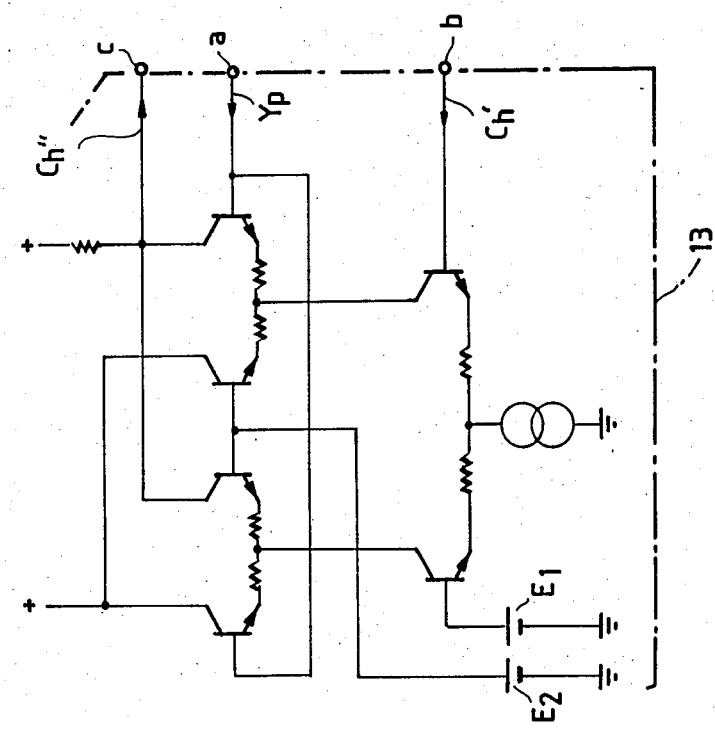
FIG. 6 is a circuit diagram of the multiplier of FIG. 3.

While in the noise extracting circuit NPC of the embodiment circuit arrangement of FIG. 3, the output signal Ch" from the multiplier 13 is subtracted from the output signal Ch' from the second signal generating circuit SG2 so as to obtain the signal Ca of FIG. 3, having no signal components but only noise, in a multiplier 13 having a structure as shown in FIG. 6 it is also possible to directly output the signal Ca having no signal components but only noise from the output terminal "c" of the multiplier 13 by setting a d.c. voltage to a peak voltage of the signal Yp wherein the d.c. voltage is fed from a d.c. voltage source E2 used for setting d.c. balance. Therefore, when practicing the present invention, the noise extracting circuit NPC may be constructed of only the multiplier 13 having the structure of FIG. 6, and in this case, the subtractor 14 of FIG. 3 can be omitted when constructing the circuit arrangement. On the other hand, when the d.c. voltage is set to a peak voltage of the signal Yp, then the multiplier 13 produces the output signal Ch" as described in the above, and therefore, the subtractor 14 is necessary for obtaining the signal Ca having only noise components.

The signal Cn having no signal components but only noise, i.e. the output signal Cn from the above-mentioned noise extracting circuit NPC, is fed to the subtractor 15 as a subtrahend signal. In the subtractor 15, the output signal Ca from the above-mentioned noise extracting circuit NPC is subtracted from the chroma signal C fed from the input terminal 10 of video signal as a minuend signal for outputting an output signal Co to an output terminal 16.

Since the output signal Co sent from the subtractor 15 to the output terminal 16 in the above-described manner has no deterioration in pulse characteristic, the above-mentioned problem inherent to the conventional examples can be satisfactorily resolved by the circuit arrangement according to the presnet invention.

Figure 7:
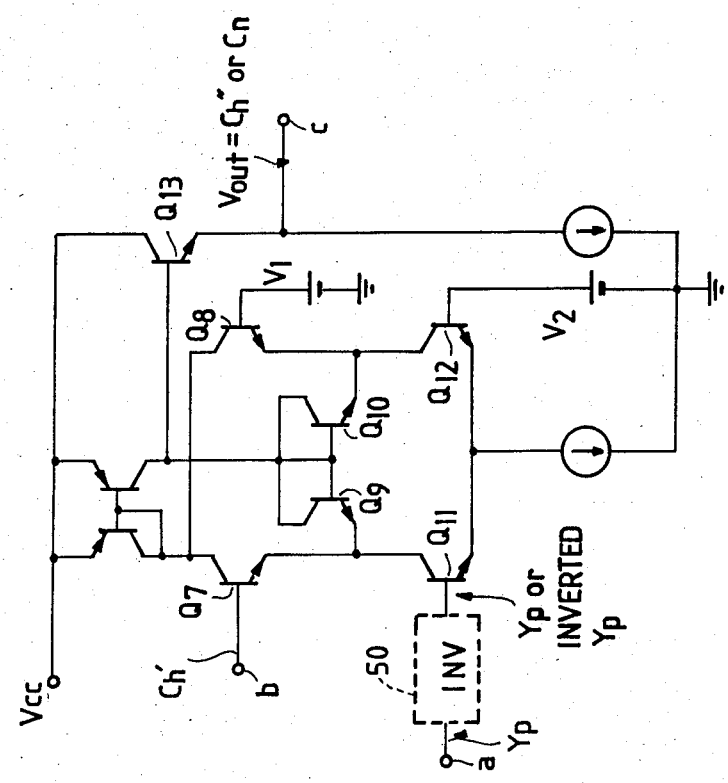
FIG. 7 is a circuit diagram of another multiplier which may be used in place of the multiplier of FIG. 6.

FIG. 7 shows a circuit diagram of a switching circuit which may be used in place of the multiplier 13 of FIGS. 3 and 6. This switching circuit of FIG. 7 is a gating circuit performing switching between the signal Ch' fed from the second signal generating circuit SG2 to a transistor Q7 and a d.c. voltage fed from a d.c. voltage source V1 fed to a transistor Q8. The contour line signal Yp from the first signal generating circuit SG1 is fed to a transistor Q11 as a gating signal, while a reference d.c. voltage is fed from a reference voltage source V2 to a transistor Q12. The transistor Q11 is rendered conductive and the transistor Q12 is rendered nonconductive when the voltage of the contour line signal Yp is greater than the reference voltage V2. As a result, current flows via the transistors Q7 and Q9 so that the input signal Ch' is outputted as an output signal Vout. On the other hand, when the voltage of the contour line signal Yp is equal to or less than the reference voltage V2, the transistor Q11 becomes nonconductive while the transistor Q12 becomes conductive. As a result, current flows via the transistors Q8 and Q10, and therefore, the output voltage Vout is fixed at the d.c. voltage V1. With this operation, the switching circuit produces the output voltage ch" of FIG. 3.

As shown in FIG. 7, when an inverter 50 shown by way of dotted lines is used for inverting the contour line signal Yp before supplying the same to the transistor Q11, then the switching circuit produces the signal Ca shown in FIG. 3. Accordingly, the subtractor 14 is not needed when the inverter 50 is employed.

Figure 8:
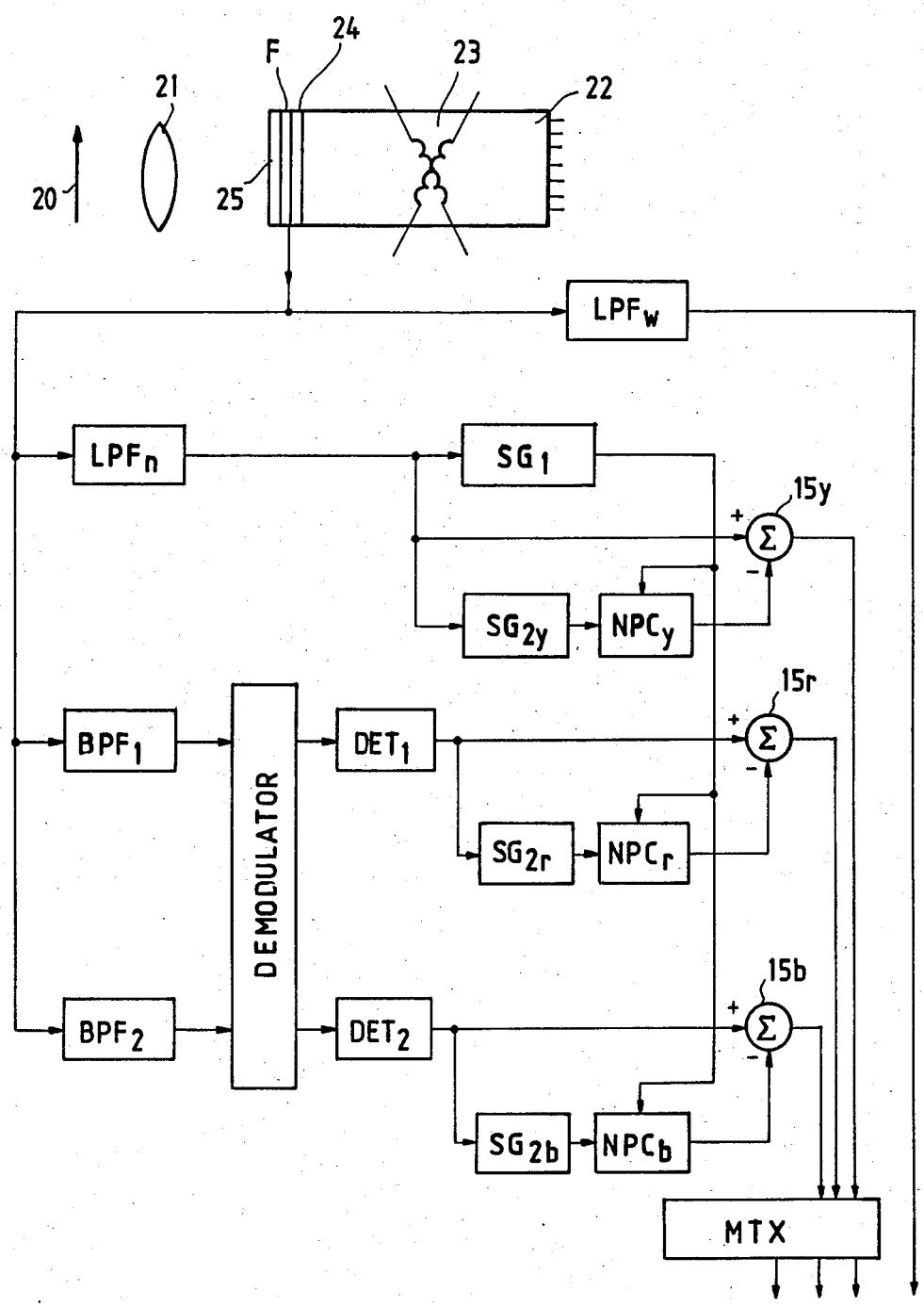
FIG. 8 is a schematic block diagram showing a circuit arrangement for a video camera to which circuit arrangement is applied the present invention.

FIG. 8 is a block diagram showing a case in which the circuit arrangement for processing video signal according to the present invention is applied to a single-tube color television camera to which step energy demodulation system is applied. In FIG. 8, the reference 20 is a subject to be imaged; 21, a lens; 22, a pickup tube; 23, a deflection yoke; 24, photoelectric converting portion; F, a color-separation stripe filter; 25, a front panel of the pickup tube; LPFw and LPFn, low pass filters; BPF1 and BPF2, band pass filters; DMD, a demodulator; DET1 and DET2, detectors; and MTX, a matrixing circuit.

In FIG. 8, SG1 corresponds to the first signal generating circuit indicated at the reference SG1 in FIG. 3, while SG2y, SG2r, SG2b and so on in FIG. 6 respectively correspond to the second signal generating circuit SG2 indicated at the reference SG2 in FIG. 3. Furthermore, NPCy, NPCr, NPCb and so on of FIG. 6 respectively correspond to the noise extracting circuit NPC indicated at the referece NPC in FIG. 3. Similarly, 15y, 15r, 15b and so on of FIG. 6 respectively correspond to the subtractor 15 indicated at the reference 15 in FIG. 3.

In the color television camera shown in FIG. 6, to the first signal generating circuit SG1 for generating a contour signal is supplied a luminance signal obtained from the output stage of the low pass filter LPFn, and the contour signal generated by the first signal generating circuit SG1 is fed to the noise extracting circuits NPCy, NPCr and NPCb so that the luminance signal and the chroma signal, whose noise has been removed or reduced while pulse characteristic is satisfactory, are fed to the matrixing circuit MTX. As a result, three primary color signals of high quality can be obtained from the matrixing circuit MTX. It is a matter of course that the circuit arrangement for processing video signal according to the present invention can be applied for removing or reducing noise of color-difference signals in the same manner as in the case of the above-mentioned primary color signals.

As is apparent from the above detailed description, since a signal including only noise is produced from a video signal, and the signal including only noise is subtracted from an original signal so that a signal whose noise has been removed or reduced is obtained in the circuit arrangement according to the present invention, the output signal from the circuit arrangement has a satisfactory pulse characteristic, and therefore it is apparent that the problem inherent to the conventional example circuit arrangement can be obviated according to the circuit arrangement for processing a video signal according to the present invention.

The above-described embodiments are just examples of the present invention, and therefore, it will be apparent for those skilled in the art that many modifications and variations may be made without departing from the spirit of the present invention.

What is claimed is:

1. A circuit arrangement for removing noise included in a color video signal including a luminance signal and a chroma signal, comprising:
    (a) first means responsive to said luminance signal of said video signal for generating a first signal indicative of the contour lines of images of a picture which is represented by said video signal;
    (b) second means responsive to said chroma signal of said video signal for generating a second signal including noise of said chroma signal, and a signal component having an amplitude substantially equal to the peak to peak value of said noise of said chroma signal;
    (c) a switching circuit responsive to said first and second signals and having a d.c. voltage source so that switching between said second signal and a d.c. voltage from said d.c. voltage source is effected in response to said first signal for producing a third signal including only said noise of said second signal; and
    (d) a subtractor responsive to said chroma signal and said third signal for producing an output color video signal indicative of the difference between said chroma signal and said noise of said third signal.

2. A circuit arrangement as claimed in claim 1, wherein said first means comprises:
    (a) a differentiator responsive to said luminance signal;
    (b) a polarity uniforming circuit responsive to an output signal from said differentiator so that differential pulses of positive and negative polarities included therein are uniformed to either positive or negative polarity; and
    (c) a clipping circuit responsive to an output signal from said polarity uniforming circuit for producing said first signal.

3. A circuit arrangement as claimed in claim 1, wherein said first means comprises:
    (a) a delay circuit responsive to said luminance signal for retarding said luminance signal by a predetermined period of time;
    (b) a subtractor responsive to said luminance signal and an output signal from said delay circuit for producing a difference signal therebetween;
    (c) a polarity uniforming circuit responsive to said difference signal so that pulses of positive and negative polarities included therein are uniformed to either positive and negative polarity; and
    (d) a clipping circuit responsive to an output signal from said polarity uniforming circuit for producing said first signal.

4. A circuit arrangement as claimed in claim 1, wherein said second means comprises:
    (a) a differentiator responsive to said chrominance signal; and
    (b) a clipping circuit responsive to an output signal from said differentiator for producing said second signal.

5. A circuit arrangement as claimed in claim 1, wherein said d.c. voltage of said d.c. voltage source is set to a peak voltage of said first signal.

6. A circuit arrangement for removing noise included in a color video signal including a luminance signal and a chroma signal, comprising:
    (a) first means responsive to said luminance signal of said video signal for generating a first signal indicative of the contour lines of images of a picture which is represented by said video signal;
    (b) second means responsive to said chroma signal of said video signal for generating a second signal including noise of said chroma signal, and a signal component having an amplitude substantially equal to the peak to peak value of said noise;
    (c) a multiplier responsive to said first and second signals so that said first signal is multiplied by said second signal for producing a third signal including only said noise of said second signal; and
    (d) a subtractor responsive to said chroma signal and said third signal for producing an output color video signal indicative of the difference between said chroma signal and said noise of said third signal.

7. A circuit arrangement as claimed in claim 6, wherein said first means comprises:
    (a) a differentiator responsive to said luminance signal;
    (b) a polarity uniforming circuit responsive to an output signal from said differentiator so that differential pulses of positive and negative polarities included therein are uniformed to either positive or negative polarity; and
    (c) a clipping circuit responsive to an output signal from said polarity uniforming circuit for producing said first signal.

8. A circuit arrangement as claimed in claim 6, wherein said first means comprises:
    (a) a delay circuit responsive to said luminance signal for retarding said luminance signal by a predetermined period of time;
    (b) a subtractor responsive to said luminance signal and an output signal from said delay circuit for producing a difference signal therebetween;
    (c) a polarity uniforming circuit responsive to said difference signal so that pulses of positive and negative polarities included therein are uniformed to either positive or negative polarity; and
    (d) a clipping circuit responsive to an output signal from said polarity uniforming circuit for producing said first signal.

9. A circuit arrangement as claimed in claim 6, wherein said second means comprises:
    (a) a differentiator responsive to said chroma signal; and
    (b) a clipping circuit responsive to an output signal from said differentiator for producing said second signal.

10. A circuit arrangement as claimed in claim 6, wherein said multiplier comprises a d.c. voltage source for providing a d.c. voltage used for d.c. voltage balancing, said d.c. voltage being set to a peak voltage of said first signal.

11. A circuit arrangement as claimed in claim 6, further comprising a subtractor responsive to said second signal and to an output signal from said multiplier for producing a difference signal therebetween which corresponds to said third signal; said multiplier comprising a d.c. voltage source for providing a d.c. voltage used for d.c. voltage balancing, said d.c. voltage being set to a base line voltage of said first signal.

* * * * *